(12) United States Patent
Hahin et al.

(10) Patent No.: US 7,650,070 B2
(45) Date of Patent: Jan. 19, 2010

(54) SELF-TESTING OPTICAL TRANSCEIVER CONTROLLER USING INTERNALIZED LOOPBACKS

(75) Inventors: Jayne C. Hahin, Cupertino, CA (US); Gerald L. Dybsetter, Scotts Valley, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 610 days.

(21) Appl. No.: 11/320,182

(22) Filed: Dec. 28, 2005

(65) Prior Publication Data

US 2006/0147217 A1    Jul. 6, 2006

Related U.S. Application Data

(60) Provisional application No. 60/640,809, filed on Dec. 30, 2004.

(51) Int. Cl.
*H04B 10/00* (2006.01)
*H04B 10/08* (2006.01)

(52) U.S. Cl. .............................. 398/9; 398/16; 398/22; 398/136

(58) Field of Classification Search ................ 398/9, 398/16, 22, 33, 135, 136, 138
See application file for complete search history.

(56) References Cited

U.S. PATENT DOCUMENTS

| | | | | |
|---|---|---|---|---|
| 5,787,114 | A * | 7/1998 | Ramamurthy et al. | 375/221 |
| 6,512,617 | B1 * | 1/2003 | Tanji et al. | 398/137 |
| 6,580,531 | B1 * | 6/2003 | Swanson et al. | 398/5 |
| 7,111,208 | B2 * | 9/2006 | Hoang et al. | 714/716 |
| 7,215,891 | B1 * | 5/2007 | Chiang et al. | 398/137 |
| 7,477,847 | B2 * | 1/2009 | Hofmeister et al. | 398/135 |
| 2004/0022537 | A1 | 2/2004 | Mecherle et al. | 398/41 |

* cited by examiner

*Primary Examiner*—Dalzid Singh
(74) *Attorney, Agent, or Firm*—Workman Nydegger

(57) ABSTRACT

An operational optical transceiver microcontroller configured to initiate a self-test using internalized loop backs. The microcontroller includes a memory, at least one processor and a number of input and output terminals. The output terminals are coupled to internally corresponding input terminals by a configurable switch. The memory receives microcode that, when executed by the processor, causes the microcontroller to close the switches so as to internally connect the output and input terminals. A signal is then asserted on the output terminal. This signal loops back and is received by the input terminal. The processor may then detect the microcontroller's response to the signal.

20 Claims, 3 Drawing Sheets

SELF-TESTING OPTICAL TRANSCEIVER CONTROLLER USING INTERNALIZED LOOPBACKS

CROSS-REFERENCE TO RELATED APPLICATIONS

This application claims the benefit of U.S. Provisional Application No. 60/640,809, filed Dec. 30, 2004, which is incorporated herein by reference in its entirety.

BACKGROUND OF THE INVENTION

1. The Field of the Invention

The present invention relates generally to optical transceiver microcontrollers. More specifically, the present invention relates to self-testing in an optical transceiver microcontroller using internalized loopbacks.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier. What would be advantageous is to improve operational testing of such a controller to verify that it is operating correctly.

BRIEF SUMMARY OF THE INVENTION

The forgoing problems with the prior state of the art are overcome by the principles of the present invention, which relate to an optical transceiver control module configured to implement self-testing by internalized loopbacks. The control module, also called a microcontroller, includes a number of input and output terminals, a memory, a processor, and a configurable switch.

The memory, which is coupled to the processor, contains microcode that, when executed by the processor, causes the control module to perform the self-test using internalized loopbacks. The control module first causes the configurable switch to close. Closing the switch internally couples one of the output terminals to one of the input terminals.

The control module then asserts a signal on the output terminal. The signal loops back and is received by the input terminal that is coupled to the output terminal by the closed switch. The response of the control module to the signal may then be determined by the processor.

Accordingly, there are many advantages created by the principles of the present invention. For example, the present invention allows the control module to perform self-testing using internalized loopbacks. This allows for diagnostics of internal signals and components of the control module without the need for an external device to complete the testing. Furthermore, there is no need to implement special external connections or wiring in order to perform diagnostics of the control module. In addition, the control module itself may initiate and control the self-test process. This may decrease testing time while cutting down on costs. It also saves valuable host computing system resources for other tasks as the host need not be involved in the control module self-test process.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an operational optical transceiver microcontroller (also referred to as a control module) configured to initiate a self-test using internalized loop backs. The microcontroller includes a memory, at least one processor and a number of input and output terminals. The output terminals are coupled to internally corresponding input terminals by a configurable switch. The memory receives microcode that, when executed by the processor, causes the microcontroller to close the switches so as to internally connect the output and input terminals. A signal is then asserted on the output terminal. This signal loops back and is received by the input terminal. The processor may then detect the microcontroller's response to the signal. An example operational optical transceiver environment will first be described. Then, the operation in accordance with the invention will be described with respect to the operational environment.

Figure 1:
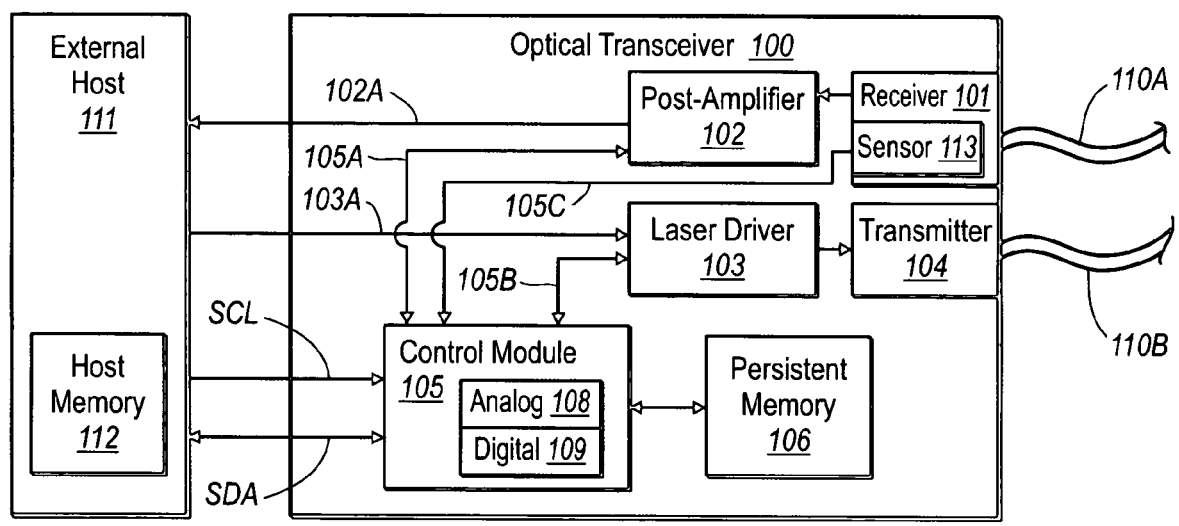
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant.

The control module 105 may have access to a persistent memory 106, which in one embodiment, is an Electrically Erasable and Programmable Read Only Memory (EE-PROM). The persistent memory 106 and the control module 105 may be packaged together in the same package or in different packages without restriction. Persistent memory 106 may also be any other non-volatile memory source.

Figure 2:
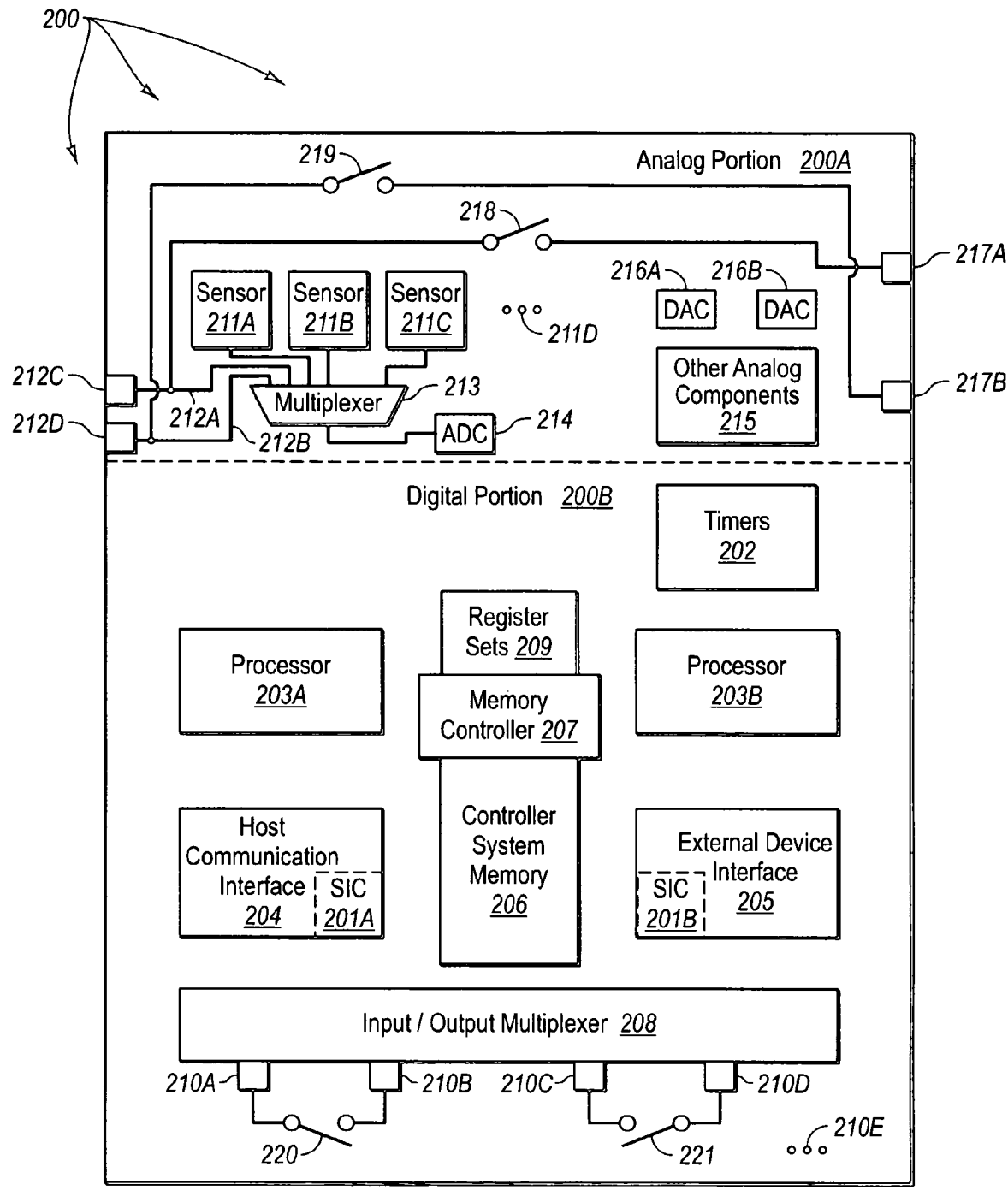
FIG. 2 schematically illustrates an example of a control module of FIG. 1 that may implement self-testing by internalized loopbacks in accordance with the principles of the present invention.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines. External lines 212A and 212B are coupled to input terminals 212C and 212D, respectively.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, other analog to digital converters, high speed comparators (e.g., for event detection), voltage based reset generators, voltage regulators, voltage references, clock generator, and other analog components. There may also be digital to analog converters ("DAC") 216A and 216B that may be used to convert digital signals to analog signals before sending the signals to other components in the optical transceiver. The signals are sent from analog output terminals 217A and 217B.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 possibly implemented using any host interface such as, for example, the two-wire interface $I^2C$ in which case serial data (SDA) and serial clock (SCL) lines are used as illustrated in FIG. 1. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as $I^2C$ or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200. Sample input/output pins or terminals 210A, 210B, 210C and 210D are depicted. There may also be additional input/output pins as represented by the ellipses 210E.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver microcontroller that may be configured to initiate a self-test using internalized loop backs.

In many instances, it would be advantageous to perform a self-test of the operation of an optical transceiver microcontroller. Performing an operational self-test allows for diagnostics and analysis of the signals and components in the microcontroller. This is especially useful during the microcontroller manufacturing process as it allows for quick discovery and analysis of operational problems. The principles of the present invention make it possible to configure the optical transceiver microcontroller to initiate a self-test using internalized loop backs. The internalized loop backs connect an output terminal of the microcontroller to an input terminal of the microcontroller, thus allowing the electrical signal transmitted by the output terminal to be received by the input terminal. In this way, the various components and functional logic blocks of the microcontroller may be tested for proper operation with little or no host involvement.

Referring again to FIG. 2, a configurable switch array is shown dispersed amongst and between the input and output terminals of control module 200. The individual switches in the configurable switch array couple an output terminal to a corresponding input terminal when closed. The specifically illustrated configurable switch array is only one example of many possible switch arrays that may be used to facilitate the principles of the present invention. Each switch in the configurable switch array may be as straightforward as being a single transistor. However, the switches may be more complex involving potentially many circuit components. In the depicted embodiment of FIG. 2, the configurable switch array includes switches 218 through 221. There may also be numerous additional switches coupled to the additional input/output terminals 210E.

Transceiver control module 200, as described above, contains processors 203 and a bank of register sets 209. In some embodiments, it may be possible that one or more of the registers 209 may be memory mapped to combinational logic that control switches 218 through 221. The processors 203 may write digital values to these registers to control the operation of the switches. For example, a register from register sets 209 may be an 8 bit register that contains a bit of digital data that controls whether a corresponding switch in the configurable switch array is open or closed. For example, if the switch receives a binary 1, then the switch array may be closed. Conversely, if the switch receives a binary 0, then the switch may be open.

In one embodiment, microcode that when executed directs control module 200 to initiate a self-test using internalized loop backs is loaded into controller system memory 206. The microcode may be loaded from persistent memory 106. Alternatively, the microcode may be loaded from host memory 112 using the implemented host communication interface such as the $I^2C$ SDA and SCL lines shown in FIG. 1. The processors 203 may execute the microcode. The executed microcode may then direct control module 200 to begin the self-test. Specific examples of self-tests using the internalized loop backs will now be described for both the analog portion 200A and the digital portion 200B.

For example, suppose that the executed microcode directed control module 200 to self-test ADC 214. A binary 1 would be written to the registers in register sets 209 that were memory mapped to switches 218 and 219, causing the switches to close, thus connecting the output terminals 217A and 217B to the input terminals 212C and 212D.

The processors 203 would then cause digital to analog converter (DAC) 216A and DAC 216B to assert an analog signal on output terminals 217A and 217B respectively. The signals would flow back to and would be received by input terminals 212C and 212D as seen in FIG. 2. The analog signal would then be propagated along lines 212A and 212B through multiplexer 213 to ADC 214. If working properly, ADC 214 would convert the analog signals to digital signals and would provide them to either register sets 209 or controller memory 206. In this way, the processors 203 would be able to detect the response of ADC 214, and potentially thereby evaluate its performance.

In like manner, the microcode may direct that processors 203 to initiate a self-test of the response of control module 200 to signals coming from other components in transceiver 100. The processors would once again close switches 218 and 219 to couple the output terminals 217 to the input terminals 212 by writing a binary 1 to the memory mapped register. The processors would then cause DACs 216A and 216B to assert on output terminals 217A and 217B respectively signals that represent operational values from components in transceiver 100. For example, a signal representative of laser bias current could be asserted on output terminal 217A while a signal representative of supply voltage could be asserted on output terminal 217B.

The laser bias signal would flow back to and be received by input terminal 212C. The signal would flow on line 212A and be propagated through multiplexer 213 to ADC 214, where the analog signal would be converted to a digital signal and provided to controller system memory 206. Here the processors 203 may read the value and determine that the laser bias current needed to adjusted. If so, then a signal would be generated and provided to a DAC and an output terminal. The processors would detect this response.

Similarly, the supply voltage signal would flow back to and be received by input terminal 212D. This signal would also be provided to the controller system memory 206. Processors 203 would also in this case detect a response of the control module to the signal and potentially thereby evaluate performance of the control module.

The internalized loop backs may also be used to self-test the other components and operations of the analog portion 200A. For example, signals could be asserted on the output terminals to test a high speed comparator, a digital-to-analog converter, or a temperature sensor. The switches 218 and 219 would be closed and the asserted signals would be received by the input terminals and cause a response as previously described.

The internalized loop backs using the input/output pins of terminals 210A through 210D may be used to self test the logical functional blocks of the digital portion 200B of control module 200. As in the analog portion 200A, the loop backs utilize switches, in this case switches 220 and 221, which couple one input/output pin to another input/output pin. The switches may be memory mapped to a register in register sets 209 as described previously.

As mentioned earlier, the digital input/output pins 210 may be assigned dynamically by the digital components according to the operational circumstances of control module 200. For example, the host communication interface 204 may assign input/output pins 210A and 210B for its use. Later, under different operational circumstances, the external device interface 205 may assign input/output pins 210A and 210B for its use.

The executed microcode may direct that host communication interface 204 assign input/output pins 210A and 210B for its use. The processors would be directed by the microcode to close switch 220 by writing a binary 1 to the memory mapped register, thus coupling the output terminal to the input terminal. The processors would then direct host communication interface 204 to assert a signal on output pin 210A. Since the pins are coupled by the closed switch 220, input pin 210B would receive the signal, which could then be provided to host communication interface 204. In this way, the response of the host communication interface while it is sending a signal and receiving a signal may be detected by the processors 203.

In like manner, the microcode may direct that a self-test be performed on the external device interface 205. As with the host communication interface, the microcode may direct that the external device interface 205 assign input/output pins 210C and 210D for its use, although pins 210A and 210B would work equally as well. The processors would be directed by the microcode to close switch 221 by either writing a binary 1 to the memory mapped register, thus coupling the output terminal to the input terminal. The processors would then direct external device interface 205 to assert a signal on output pin 210C. Since the pins are coupled by the closed switch 221, input pin 210D would receive the signal, which could them be provided to external device interface 205. In this way, the response of the external device interface while it is sending a signal and receiving a signal may be detected by the processors 203. The internalized loop backs may also be used to self-test the other components and functional logic blocks in digital portion 200B.

Figure 3:
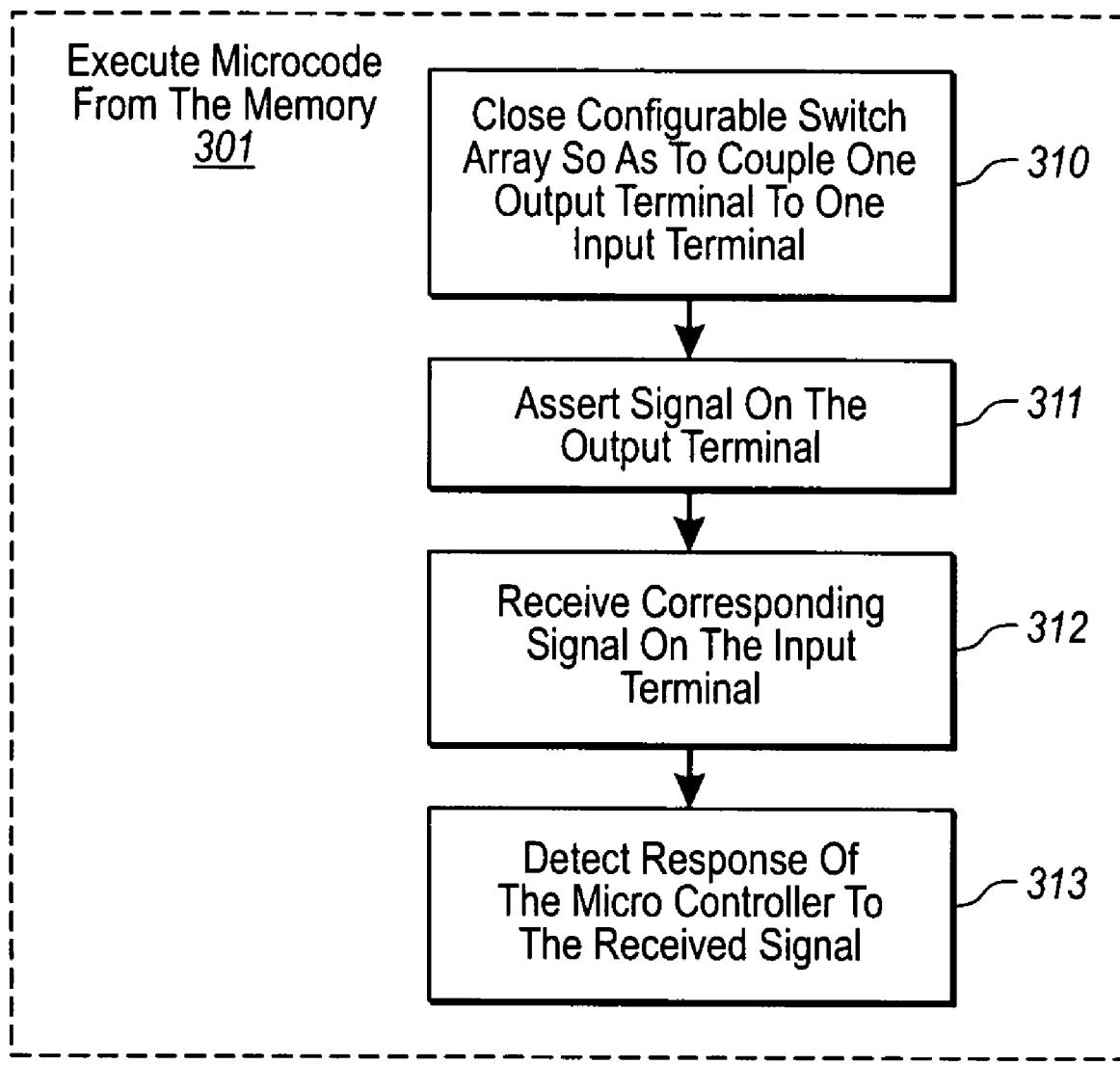
FIG. 3, illustrates a flow chart of a method for an optical transceiver microcontroller to perform internal loopbacks.

Referring to FIG. 3, a flow chart of a method 300 for an optical transceiver microcontroller to perform internal loopbacks is illustrated. Method 300 will be described with frequent reference to the specific transceiver embodiment described in relation to FIGS. 1 and 2. Note that the embodiment of FIGS. 1 and 2 is for illustration only and should not be used to limit the scope of the appended claims as it will appreciated by those skilled in the art that there may be numerous optical transceiver microcontroller embodiments that may be used to perform method 300.

Method 300 includes an act of executing microcode from memory, wherein the microcode is structured such that when executed by the at least one processor, causes the optical transceiver microcontroller to perform acts 310-313 (act 301). For example, processors 203 may execute microcode in controller system memory 206 or persistent memory 106. Alternatively, the processors 203 may write microcode to one or more memory mapped registers.

The executed microcode causes the microcontroller to close the configurable switch array so as to couple at least one output terminal to an input terminal (act 310). For example, switch 218 may close to couple output terminal 217A to input terminal 212C.

The microcontroller may then assert a signal on the output terminal (act 311) and receive a corresponding signal on the input terminal (act 312). For example, an analog signal representing an analog component of transceiver 100 may be asserted on output terminal 217B. A corresponding analog signal may then be received by input terminal 212C.

The response of the microcontroller to the received signal at the input put terminal may then be detected (act 313). For example, the processors 203 may detect how the sensors 211 respond to the analog signal received at input terminal 212C.

Accordingly, the principles of the present invention provide for an optical transceiver with many benefits over current optical transceivers. Specifically, the present invention allows for a transceiver control module to perform self-tests using internalized loop backs. This allows for diagnostics of the signals and components within the control module without the need for additional, external connections. In addition, the present invention makes it possible to configure microcode to control the internalized loop backs. This may decrease the testing time while cutting down on costs. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver microcontroller comprising:
   a plurality of input terminals;
   a plurality of output terminals;
   a memory;
   at least one processor coupled to the memory so as to be capable of executing microcode from the memory during operation;
   a configurable switch array that couples one of the output terminals to one of the input terminals when closed;
   wherein the memory has microcode that when executed by the at least one processor, causes the at least one processor to cause the microcontroller to self-test by performing the following:
   act of closing the configurable switch array;
   an act of asserting an electrical signal on the output terminal;
   an act of receiving the electrical signal on the input terminal through the configurable switch array; and
   an act of detecting a response of the microcontroller to the received electrical signal on the input terminal.

2. An optical transceiver microcontroller in accordance with claim 1, wherein the optical transceiver microcontroller is configured to close the configurable switch array by writing data to a register coupled to the configurable switch array.

3. An optical transceiver microcontroller in accordance with claim 1, wherein the asserted signal is an analog signal.

4. An optical transceiver microcontroller in accordance with claim 1, wherein the asserted signal is a digital signal.

5. An optical transceiver microcontroller in accordance with claim 1, wherein the executed microcode is configured to direct a self-test of internal digital components of the optical transceiver microcontroller.

6. An optical transceiver microcontroller in accordance with claim 1, wherein the executed microcode is configured to direct a self-test of internal analog components of the optical transceiver microcontroller.

7. An optical transceiver microcontroller in accordance with claim 6, wherein the internal analog components are one or more of a sensor, a multiplexer, an analog-to-digital converter, a high-speed comparator, or a digital-to-analog converter.

8. An optical transceiver microcontroller in accordance with claim 1, wherein the executed microcode is configured to direct a self-test of logical functional blocks of the optical transceiver microcontroller.

9. An optical transceiver microcontroller in accordance with claim 8, wherein the logical functional blocks are one of a host communication interface or an external device interface.

10. An optical transceiver microcontroller in accordance with claim 1, wherein the executed microcode is configured to direct a self-test of the response of the optical transceiver microcontroller to output signals looped back to one of the plurality of input terminals.

11. In an optical transceiver microcontroller including a plurality of input terminals, a plurality of output terminals, a memory, at least one processor, and a configurable switch array, a method for the optical transceiver microcontroller to perform a self-test, the method comprising:
   an act of executing microcode from the memory, wherein the microcode is structured such that when executed by the at least one processor, causes the optical transceiver microcontroller to perform the following:
   an act of closing the configurable switch array so as to couple one of the output terminals to one of the input terminals;
   an act of asserting an electrical signal on the output terminal;
   an act of receiving the electrical signal on the input terminal through the configurable switch array; and
   an act of detecting a response of the microcontroller to the received electrical signal on the input terminal.

12. A method in accordance with claim 11, wherein the asserted signal is an analog signal.

13. A method in accordance with claim 11, wherein the asserted signal is a digital signal.

14. A method in accordance with claim 11, wherein the executed microcode directs a self-test of internal analog components of the optical transceiver microcontroller.

15. A method in accordance with claim 14, wherein the internal analog components are one or more of a sensor, a multiplexer, an analog-to-digital converter, a high-speed comparator, or a digital-to-analog converter.

16. A method in accordance with claim 11, wherein the executed microcode directs a self-test of logical functional blocks of the optical transceiver microcontroller.

17. A method in accordance with claim 16, wherein the logical functional blocks are one of a host communication interface or an external device interface.

18. A method in accordance with claim 11, wherein the executed microcode directs a self-test of the response of the optical transceiver microcontroller to external signals.

19. A method in accordance with claim 11, wherein the executed microcode directs a self-test of internal digital components of the optical transceiver microcontroller.

20. A method in accordance with claim 11, wherein the memory receives the microcode from a host computing system that is coupled to the microcontroller or from an optical transceiver persistent memory that is coupled to the microcontroller.

* * * * *

UNITED STATES PATENT AND TRADEMARK OFFICE
CERTIFICATE OF CORRECTION

PATENT NO. : 7,650,070 B2
APPLICATION NO. : 11/320182
DATED : January 19, 2010
INVENTOR(S) : Hahin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 965 days.

Signed and Sealed this

Twenty-third Day of November, 2010

David J. Kappos
*Director of the United States Patent and Trademark Office*